UNITED STATES PATENT OFFICE.

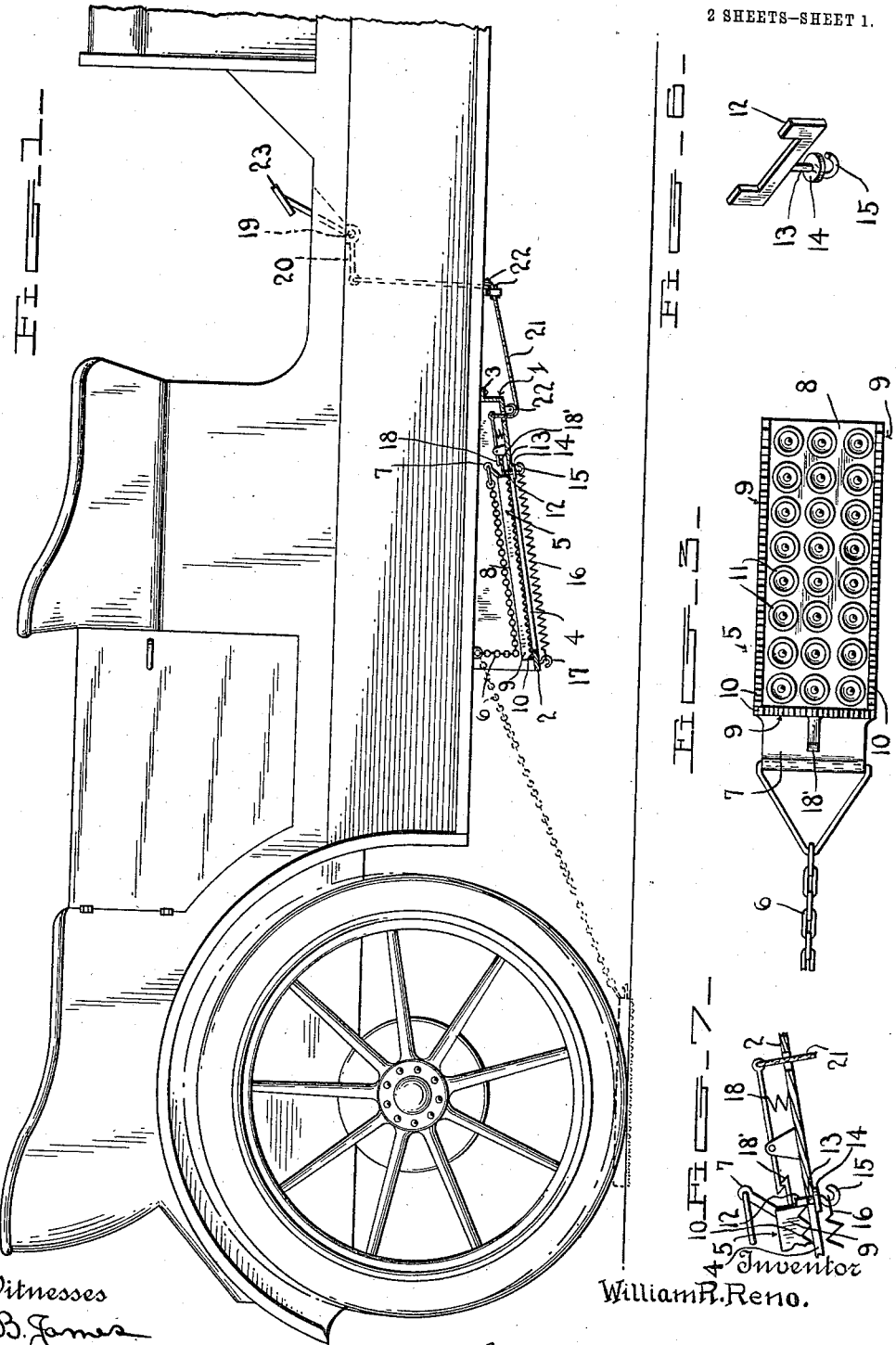

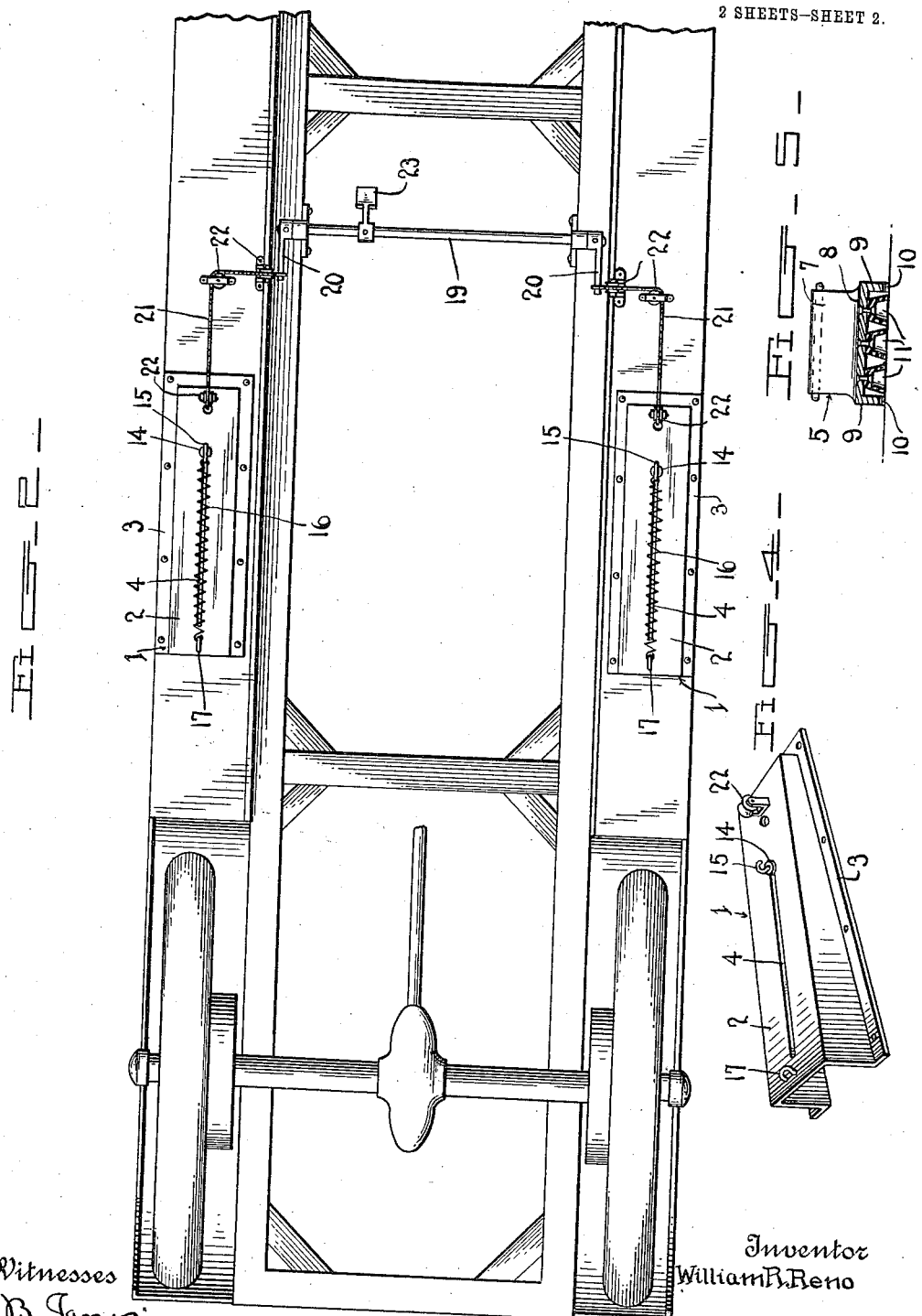

WILLIAM RAY RENO, OF LOUISVILLE, KENTUCKY.

EMERGENCY-BRAKE.

1,023,682.

Specification of Letters Patent. Patented Apr. 16, 1912.

Application filed February 16, 1911. Serial No. 608,930.

*To all whom it may concern:*

Be it known that I, WILLIAM R. RENO, a citizen of the United States, residing at Louisville, in the county of Jefferson and State of Kentucky, have invented certain new and useful Improvements in Emergency-Brakes; and I do declare the following to be a full, clear, and exact description of the invention, such as will enable others skilled in the art to which it appertains to make and use the same.

This invention relates to improvements in emergency brakes for motor vehicles.

One object of the invention is to provide an improved construction and arrangement of brake mechanism for motor vehicles whereby the latter may be quickly brought to a stop without stopping the motor thus saving the time required for this operation, which is necessary when brakes of the usual construction are employed.

Another object is to provide an improved means for housing the brake shoes when not in use and means whereby the same are projected from the housing to operative positions.

With these and other objects in view, the invention consists of certain novel features of construction, combination and arrangement of parts as will be more fully described and particularly pointed out in the appended claims.

In the accompanying drawings: Figure 1 is a side view of a portion of an automobile showing the application of the invention, parts being broken away and in section; Fig. 2 is a bottom plan view of the same; Fig. 3 is a bottom plan view of the brake shoe; Fig. 4 is a perspective view of one of the brake shoe housings showing the same in an inverted position; Fig. 5 is a vertical cross sectional view of one of the brake shoes; Fig. 6 is a detail perspective view of the brake block ejecting plungers; Fig. 7 is an enlarged detail sectional view of the upper end of the casing and shoe showing more clearly the construction and arrangement of the catch mechanism for holding the shoe in retracted position.

In the embodiment of the invention I provide two casings 1, in the form of oblong boxes open at one end and having inclined bottoms 2 and on their upper edges right angular attaching flanges 3. One of the casings 1 is secured to the lower side of each of the running boards of the vehicle adjacent to and in line with the rear wheels. In the bottom 2 of each casing is formed a longitudinal guide slot 4.

Slidably supported in the casings 1 are brake shoes or blocks 5 which are adapted to be forcibly projected from the casings in front of the rear wheels whereby the latter will run onto said blocks and will be thereby lifted out of engagement with the ground and prevented from driving the vehicle. The blocks or shoes 5 are secured to the vehicle and held in position when engaged by the wheels of the vehicle by chains 6 secured at one end to a bracket 7 on the forward ends of the blocks and at their opposite ends to the lower sides of the running boards as shown.

The brake blocks or shoes 5 are in the form of rectangular plates 8 having on their side and front end edges downwardly projecting flanges 9. The lower edges of the flanges 9 are serrated or provided with teeth 10 which when the weight of the rear wheels and end of the vehicle is applied to the plate will bite into the surface over which the vehicle is moving.

I prefer to secure to the lower side of the plate 8 between the flanges 9, a series of vacuum cups 11 which when the shoes are thrown into engagement with the roadway will form a suctional contact therewith. By providing the brake shoes with the teeth 10 and the cups 11 a firm engagement will be obtained between the shoes and the road surface.

The special construction of shoe forms no part of the present invention but is reserved as the subject of a future application.

The blocks or shoes 5 when not in use rest on the inclined bottoms of the casings 1 and are forcibly ejected therefrom when required, by ejecting devices comprising plunger plates 12 having on their lower edges shanks 13 which project through the slots 4 in the bottom of the casings and have thereon guide plates 14 and hooks 15. With the hooks 15 are connected one end of coiled springs 16 the opposite ends of which are connected to hooks 17 secured to the under side of the casings as shown.

The brake shoes when arranged in the casings 1 engage the plunger plates 12 and force the same back in the casing thus stretching the springs 16. The shoes are held in a retracted position in the casings by spring actuated catches 18 which are pivotally mounted in the casings and are adapted to be engaged with beveled catch lugs 18' arranged on the inner ends of the brake shoes as shown.

When the catches are released the plunger plates 12 actuated by the coiled springs 16 will project the brake shoes from the casings and into position to be engaged by the rear wheels of the vehicle. In order to permit the operator of the vehicle to apply the brakes at the proper time I provide a catch releasing mechanism comprising a rock shaft 19 mounted in suitable bearings on the underside of the vehicle body and having on its ends crank arms 20. To the arms 20 are connected the outer ends of catch releasing cords 21 which pass over and around guide pulleys 22 and are connected at their inner ends to the catches 18 whereby the latter are disengaged from the catch lugs 18' when the shaft 19 is rocked. The shaft 19 is preferably provided with a foot lever 23 which projects up through the floor of the vehicle and is adapted to be engaged by the foot of the operator to rock the shaft 19 and thereby release the brake shoes in the manner described.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined in the appended claims.

Having thus described the nature of my invention what I claim is:—

1. An emergency brake for motor vehicles, comprising casings having inclined longitudinally slotted bottoms, brake shoes slidably supported in said casings, shoe projecting plungers adapted to engage and project said shoes from the casings, shanks formed on said plungers and projecting through said slots, plunger operating springs connected to said shanks, catches arranged in said casings, catch lugs on said shoes to receive said catches and means whereby the latter are disengaged by the operator of the vehicle.

2. An emergency brake for motor vehicles, comprising casings, spring projected brake shoes arranged in said casings, catch lugs on said shoes, catches in said casings to engage said lugs and hold the shoes in operative position, a suitably mounted rock shaft, crank arms arranged on the ends thereof, flexible connections between said crank arms and said catches and an operating lever connected to said rock shaft whereby the same is actuated to release said catches.

In testimony whereof I have hereunto set my hand in presence of two subscribing witnesses.

WILLIAM RAY RENO.

Witnesses:
ALLEN HIEATT,
ORMSBY DE BUTTS GRAY, Jr.

---

Copies of this patent may be obtained for five cents each, by addressing the "Commissioner of Patents, Washington, D. C."